Patented June 21, 1932

1,864,044

UNITED STATES PATENT OFFICE

EARDLEY HAZELL, OF NEW YORK, N. Y., ASSIGNOR TO THE NAUGATUCK CHEMICAL COMPANY, OF NAUGATUCK, CONNECTICUT, A CORPORATION OF CONNECTICUT

METHOD OF MANUFACTURING RUBBER ARTICLES

No Drawing.    Application filed August 19, 1927.    Serial No. 214,205.

This invention relates to the manufacture of rubber articles from latex, more particularly by deposition directly from a body of the latex on a porous form of any suitable permeable character.

It aims to provide a new and improved process for facilitating the deposition of rubber from latex or equivalent dispersion or suspension. More specifically it aims to provide a process for increasing the rate at which rubber may be deposited in a desired shape or condition by (1) dilution (2) the addition of substances increasing its ability to filter off the aqueous portion through the deposit as it builds up in thickness (3) agitation and (4) heating. The rate of deposition may be increased by employing some of the steps above mentioned, but maximum results may be obtained by using all of them under optimum conditions. The stability of the latex composition against coagulation, and the ability of the latex to hold in uniform distribution compounding ingredients for imparting desired characteristics to the finished article and to maintain a constant consistency are also improved by the present invention. These are some of the objects of the invention, others will be manifest to those skilled in the art from the subsequent detailed description.

With the preferred process in mind, but without intention to limit more than is required by the prior art, the invention, briefly stated, consists in diluting the latex or dispersion to lower its solid content, adding substances thereto which increase its filterability, agitating the latex either continuously or intermittently, and/or heating to a temperature below that at which coagulation of the dispersion would occur.

The invention contemplates the manufacture of rubber articles in general such as inner tubes, hose (garden or fire), rubberized fabrics or articles, gloves of rubber only or of rubber and fabric, boots and shoes made wholly of rubber or of rubber and fabric, or comprehensively stated, of any kind of rubber article to which the invention is applicable. In the specification and claims the expression "porous form" is used to comprehend any permeable material on which, by abstraction of the aqueous portion of the dispersion through the form, rubber may be deposited in the shape and condition desired, whether the surface of the material becomes a part of the finished article or not. For instance, the porous form may be of unglazed earthenware from which the deposit is ultimately stripped, or it may be composed entirely or superficially of fabric. The shape of the porous form may be anything desired. Obviously the pores of the form should be small enough to prevent the entry of any appreciable amount of rubber particles.

It has been discovered that the rate of deposition of rubber and like materials from natural latex may be increased by the addition of metallic oxides and sulphide solutions. For instance, if zinc oxide and sodium polysulphide are incorporated in the following composition:

Rubber latex (preserved with 1% of ammonia and containing 37.5 parts rubber)_____ 100 parts
Zinc oxide_____ 3 parts
Sodium polysulphide solution (42% of solid sodium polysulphide analyzing 32.5% of sulphur)_____ 0.2–1.0 cc.
Undecylenic acid (crude emulsion)_____ 1 part the rate of deposit as compared with the same composition without the sodium polysulphide is increased as shown by the following table:

| Ccs. sodium polysulphide per 100 ccs. latex | Rate of deposit |
|---|---|
| Blank | .004 |
| .4 | .012 |
| .7 | .0185 |
| 1.0 | .027 |
| 1.3 | .035 |
| 1.7 | .075 |

The rate of deposit is taken as the thickness of rubber formed on a porous vessel immersed in a latex for five minutes and then dried.

As another example, a stabilizing ingredient such as glue may be added to latex before the zinc oxide. With this illustration 1 part of glue is added to latex containing 37% of total solids and preserved with 0.67% of ammonia. Zinc oxide is added to the latex in the form of a zinc oxide-glue paste containing 1 of glue to 3 zinc oxide per 100 of rubber. After 2 days, from 0.2–0.7% of sodium polysulphide solution may then be introduced. The results obtained with this example are illustrated in the following table:

| Ccs. sodium polysulphide solution per 100 ccs. latex | Rate of deposit |
|---|---|
| Blank | .005 |
| .2 | .013 |
| .4 | .016 |
| .7 | .032 |

A larger increase in the rate of deposition may be produced by the use of additional amounts of zinc oxide or ammonium hydroxide or by the addition of any ammonium salt, with the exception of ammonium phosphate.

Vulcanization of the rubber in the latex does not take place in the above examples as is evidenced by the fact that the amount of sulphur present in the latex as combined sulphur can be substantially entirely accounted for in the zinc sulphide formed in the latex. In other words combined sulphur determinations on the rubber portion of the latex show substantially the same percentages before and after treatment, indicating that no vulcanization could have taken place.

Instead of sodium polysulphide, the sulphides or polysulphides of sodium, potassium, lithium, ammonium, may be used with various degrees of advantage. The zinc oxide in the example next preceding may be replaced by zinc hydroxide or by any soluble zinc salt dissolved in water or in a solution containing ammonium hydroxide in excess.

The increased rate of deposit may be obtained by adding sulphide solutions to vulcanized as well as unvulcanized latex. To illustrate this the following example is given:

A quantity of latex is concentrated and purified by the addition of 1 part of hydrophylic material such as pectine, Irish moss, etc., and after the rubber portion has separated in a supernatent layer, the serum is removed, and the rubber portion diluted with water to give 20% of solids. A paste consisting of 3 parts of zinc oxide, 3 parts of sulphur, 1 part glue, and 4 parts of water is then prepared and added to the latex in a quantity sufficient to give 3 parts of zinc oxide per 100 of rubber. To the latex is then added 1 part of sodium dithiobenzoate in the form of a 7% solution, and the latex containing the vulcanizing combination is heated for 3 hrs. at 65° C. After vulcanization the latex contained 0.16% of ammonia. To this vulcanized latex are now added various quantities of sodium polysulphide solution, as described in the first example. In the following table the blank contains no added sodium poly-sulphide and is therefore indicative of the results which may be obtained with ordinary vulcanized latex. The inclusion of sodium polysulphide in the amounts given in the following table greatly improves the rate of deposit.

| Ccs. sodium polysulphide solution per 100 ccs. latex | Rate of deposit |
|---|---|
| Blank | .0137 |
| .15 | .0165 |
| .3 | .024 |
| .45 | .038 |

As another illustration of vulcanized latex, to a quantity of ammonia preserved latex containing less than 0.1% of ammonia is added a paste comprising 2 parts of zinc oxide, 3 parts of sulphur, 1 part of glue, and 4 parts of water. An emulsion is then prepared to contain 1 part of oxy normal butyl thiocarbonic acid disulphide, 1 of glue, 2 of solvent naphtha, 0.5 of sodium oleate, and 35 of water. A similar emulsion is also prepared using ½–1 part of aniline in place of the 1 part of disulphide. These emulsions are then added to the latex, and vulcanization allowed to take place. After vulcanization has taken place, the vulcanized latex is treated with sodium polysulphide solution. The effect of this solution upon the rate of deposit of the vulcanized latex is shown in the following table:

| Ccs. sodium polysulphide solution per 100 ccs. of latex | Rate of deposit |
|---|---|
| Blank | .0155 |
| .15 | .018 |
| .3 | .024 |
| .45 | .050 |

A latex which contains oxy normal butyl thiocarbonic acid disulphide may be treated with aniline or other similar amine to increase its rate of deposit.

The increased rate of deposit which is believed to be imparted by the formation of colloidal metallic sulphides or polysulphides in the latex may also be accomplished by the formation of other colloidal precipitates in the same manner. The improvement may also be gained by the direct addition of colloidal sulphides, polysulphides or precipitates. Rubber obtained from such vulcanized latex, which has been treated with sodium polysulphide, shows an appreciable improvement in tensile strength and in resistance to ageing.

It has also been discovered that after rubber latex or similar aqueous dispersions which have been treated to increase the rate of filterability by the addition of chemical substances, the rate of deposition of such latex or dispersion may be increased by agitation, or heating, or both, the latter augmenting the rate of deposition by the sum of the increments of each treatment. Generally the agitation may be carried on continuously or intermittently and the heat treatment may be varied from room temperature up to a temperature below that causing coagulation. As one illustration of this phase of the invention, a natural rubber latex, ammonia preserved and containing 30% of total solids, may have the property of rapid filterability imparted to it by the following treatment: To 100 parts of rubber in the form of latex are added a small amount of stabilizing agent and about 3 parts of zinc oxide and a solution of sodium polysulphide containing approximately 42% of solid sodium polysulphide analyzing 32.5% of sulphur, (.9 ccs. of this solution, sp. g. 1.33 per 100 ccs. of latex). Preferably, although not necessarily, a small amount of a stabilizing agent is added with the polysulphide, say ¼ to ½ parts by weight of sodium oleate or undecylenic acid in the form of a soap or aqueous emulsion or glue or casein or any of the customary protective colloids used in latex. This composition after standing for a short time has the property of rapidly depositing its rubber upon a filtering body, that is, it possesses the property of rapid or easy filterability. This composition when disposed in contact with a filtering medium such as a porous plate or vessel or other filtering medium will give a thickness of deposit of about .030 inches in 5 min. If this same latex composition be stirred either continuously or intermittently at a speed of 70 lineal feet per minute for a total of 45 min., and subsequently deposited the rate of deposit under the same conditions will be increased by 150%. If this same latex be heated to 40° C., the rate of deposition of the rubber in the latex under the same conditions will be increased by about 50%. If both stirring and heating be applied to the latex composition, the rate of deposit is approximately 200% greater than the unheated latex without these treatments, that is, the total increase is approximately the sum of the increase gained by the separate treatments.

The beneficial effect caused by the foregoing treatment of latex may also be secured with latex containing compounding ingredients. For example, a latex suitably compounded for the manufacture of articles may be treated with say zinc oxide and sodium polysulphide as above described, the zinc oxide and the sodium polysulphide being added in about the same proportions with reference to the rubber in the latex composition as herein described. A composition containing

| | |
|---|---|
| Rubber as 39% latex | 100 parts |
| Zinc oxide | 5 parts |
| Glue | 3 parts |
| Sulphur | 1.60 parts |
| Whiting | 10 parts |
| Carbon black | 0.3 parts |
| Spindle oil | 10.0 parts |
| Sodium oleate | 0.15 parts |
| Paraffine | 0.5 parts |
| Solvent naphtha | 2.25 parts |
| Accelerator | 0.15 parts |
| Water | 21.0 parts |
| Sodium polysulphide | 0.95 ccs. per 100 ccs. of latex (about .5 parts by weight) | will yield a deposit of rubber (after drying) of about .07 inches in 45 min., the latex being heated to 23° C.

The beneficial effects of agitation and heat treatment may also be obtained in varying degrees with rubber latex or equivalent aqueous dispersions which have been treated to increase the rate of filterability by the addition of substances other than metallic oxides and polysulphides. Generally stated, these other substances embrace gel-forming colloids, buffer solutions which influence the degree of aggregation of the particles of rubber by control of their hydrogen ion concentration, substances liberating metallic ions, and vulcanized latex brought about by the incorporation of preferably accelerating substances capable of effecting vulcanization at temperatures preferably below those employed in hot vulcanizing methods. Such substances so generally referred to have been disclosed in prior patent to Hopkinson and Gibbons No. 1,632,759 granted June 14, 1927 and reference is made thereto for a full understanding of the scope of this phase of the invention.

It has further been discovered that by diluting the latex or dispersion the rate of deposition may also be increased. The extent of dilution may be varied within wide limits but the greatest advantage has been obtained with a latex composition containing between 8 and 24% solids, the optimum dilution being around 14% solids. Latex diluted within the range above mentioned and to which are added substances such as those above mentioned increasing its rate of filterability through a porous form, upon agitation or heating, or both agitation and heating, has been found to deposit more rapidly or yield a layer of rubber of greater thickness in a given time than the same latex composition which has not been diluted. As an illustration, the above mentioned latex composition may be employed, using various concentrations of latex and adding for each 100 ccs. of latex 0.9 ccs. of an aqueous solution of sodium polysulphide containing 42.5% of polysulphide. The beneficial effect upon the rate of filterability may be seen in the following table:

| Concentration | Thickness of deposit (dry) |
|---|---|
| 38.8 | .070 inches |
| 31.5 | .073 |
| 24.0 | .075 |
| 20.0 | .140 |
| 18.0 | .146 |
| 14.0 | .242 |
| 7.7 | .050 |

It will be observed that the most favorable concentration of latex is 14%, where the increased rate of deposit due to dilution of the latex is about 350%.

If each of the compositions represented by the above range of dilutions be agitated just after preparation for a time, it will be observed that the thickness of deposit will be further increased by 125-175%. If each of the respective compositions be heated after preparation to say 35° C., each will show an increased rate of deposit of about 50%. When both agitation and heating are employed, the increase in rate of deposit is the sum of the increments gained by the separate treatments of agitation and heating. In other words the increase due to agitation and heating will be 175-225% or roughly about 200%. Selecting a latex of 19-20% solid content and agitating just after preparation for 1 hr. at a lineal speed of 70 feet per min., a deposit of .375 inches thickness may be obtained in 45 min. If the same latex composition be heated to 35° C. after the agitation, the thickness of deposit upon drying will be 0.5 inches in the same length of time (45 min.)

In the above table the thickness of deposit is that obtained by filtering the latex composition on a body composed of paper pulp and celite, under a pressure corresponding to 60-70 cm. of mercury, the filtering temperatures being approximately 22-24° C.

It has still further been discovered that the increased rate of deposit obtained by diluting the latex is augmented when the substances increasing its rate of filterability are employed in certain definite proportions relative to the volume of the latex, and that agitating and/or heating such latex compositions containing the optimum quantities of the substances yield deposits of maximum thickness. Hence, the invention in its preferred embodiment contemplates dilution, the addition within certain limits of definite quantities of substances increasing the rate of filterability, agitation, and heating. Furthermore, in this preferred procedure there is the least difficulty from air bubbles forming in the deposit.

From latex compositions similar to those above mentioned containing varying amounts of total solids and also containing varying amounts of polysulphide solution per 100 cc. of latex, the following table of observations as to the rate of deposition was made:—

Weight of deposit in grams per 92.5 cm² in 45 min.

| Concentration of latex—% solids | Ccs. of 42.5% polysulphide solution per 100 ccs. of latex | | |
|---|---|---|---|
| | .8 ccs. | .9 ccs. | 1.0 ccs. |
| | Grams | Grams | Grams |
| 8 | 10 | 8 | 10 |
| 14 | 26 | 44 | 32.5 |
| 20 | 16 | 18 | 20 |
| 24 | 12 | 12 | 15 |
| 31.5 | 12 | 12 | 12 |

The same latex compositions upon agitation after preparation yielded a deposit per unit area in the same length of time approximately 150% greater in thickness than when not agitated. Similarly on heating after preparation, an increased weight of deposit in the same length of time amounted to about 50% of that obtained at room temperature. If both agitation and heating be utilized the total increase in amount of rubber deposited in unit time will be in the neighborhood of 200% for each concentration. From this it is apparent that the increase gained by selecting the most favorable amount of polysulphide carries through the subsequent agitation and heating treatments. The greatest deposit is obtained with a latex containing 14% of solids and about 0.9 ccs. of polysulphide solution per 100 ccs. of latex. With latex containing 14% solids the most favorable quantity of polysulphide which should be added ranges between .75 and 1.1% of a 42% solution of $Na_2S_x$, aq., these percentages being by volume on a normal ammonia preserved latex containing about 5% of zinc oxide on the rubber. When, however, the latex composition employed is vulcanized, or heavily compounded, or is made up with a creamed latex, a wider range of percentage of polysulphide may be used, for example 0.1 cc.-2.0 cc. of polysulphide solution per 100 ccs. of latex. A 42% solution of sodium polysulphide is a convenient concentration, but other concentrations may be used, it being understood that corresponding corrections on the percentage of polysulphide added to the latex should be made for the particular concentration of polysulphide solution. The solution containing approximately 42% of polysulphide is quite convenient to handle in practice and in many respects is preferable to more dilute solutions.

While the invention has thus far referred mainly to increasing the rate of filtration or the weight of deposit of rubber upon a filtering body the treatments also have another beneficial effect; that of influencing the consistency of the latex composition. Latices having a rapid rate of deposition or being capable of depositing their rubber by filtration, will show a high consistency, that is, will be quite thick, possessing low mobility and/or fluidity. This consistency frequently shows a tendency to vary, the result of which is that the rate of filtration will show a variation for the same composition upon standing. It has been discovered that the agitation and heat treatment herein described have a marked effect upon the consistency of the filterable latex compositions. If the latex composition be agitated either violently or gently for a period of time, the consistency is greatly reduced and in time tends to reach a constant value. Alternate periods of agitation and rest will bring about a reduction of consistency to a constant figure and rate of filtration to a constant value. The same is true of the application of heat to the composition and also of the concentration of agent imparting filterability to the latex, and particularly to the amount of polysulphide added to the latex. Dilution of latex to 8-24% solids also has a favorable effect upon the reduction of the consistency of the composition. Referring more particularly to the manufacture of articles by filtration methods, the reduction in consistency permits the standardization of manufacturing operations in point of time required to produce an article of predetermined thickness, eliminating variations in this thickness due to changes in the consistency of the composition and therefore changes in its rate of filterability. As the consistency of the composition is reduced it becomes easier to remove bubbles from the composition and thus to prevent imperfections during the manufacture of articles.

The invention may be applied to the manufacture of any article to which it is adapted whether made entirely of rubber or partly of rubber and fabric or other material. It may be used in conjunction with electro-deposition processes as well as in simple deposition on a porous form, inasmuch as the increased rate of deposition which may be obtained by the employment of this invention augments the rate of deposit obtained by the passage of an electric current. It of course also may be used for filtration under elevated or reduced pressure.

The invention is primarily concerned with increasing the rate of deposition of rubber or similar materials from their latices as obtained from the plantations but is applicable to artificially prepared latices sufficiently imitating natural latex to be susceptible of the processing of the present invention with advantage. The term "latex" in the specification and claims comprehends natural latex and such artificially prepared latices, and includes Hevea latex as well as the species other than Hevea. All substances which increase the rate of filterability of the latex have been found to cause it to more rapidly deposit on a porous form when diluted, agitated, and/or heated, and particularly when the substances added to increase the rate of filterability have been incorporated in optimum proportions. It is to be understood, however, that the advantageous proportions of the added substances which increase the rate of filterability vary with their nature and with the dilution of the latex and likewise also with the extent or degree of agitation and/or heating. For optimum manufacturing results these should be judiciously selected. Changes and alterations in the process are therefore intended to be comprehended within the scope of the accompanying claims, to which reference is made for an understanding of the limits of the invention, which comprehends all uses to which the invention may be put without departing from its underlying principles.

Having thus described my invention, what I claim and desire to protect by Letters Patent is:

1. A process for manufacturing rubber articles from latex which comprises treating the latex with material which increases its filterability, agitating the latex prior to the deposition thereof to further increase its filterability, retaining the said material in the latex, and depositing rubber from the thus treated latex on a porous form.

2. A method of increasing the rate of deposition of rubber from latex which comprises treating the latex with material which increases its filterability, agitating the thus treated latex prior to the deposition of rubber therefrom and while retaining the said material in the latex.

3. A process for manufacturing articles from latex which comprises treating the latex with a zinc compound and a polysulphide, agitating the latex, and depositing rubber from the thus treated latex.

4. A method of increasing the filterability of latex which comprises treating the latex with a colloidal metallic sulphide and agitating the thus treated latex.

5. A process for manufacturing rubber articles from latex which comprises treating the latex with material which increases its filterability, agitating the latex while retaining the said material in the latex, and depositing rubber from the thus treated latex.

6. A process for manufacturing rubber articles from latex which comprises treating the latex with a zinc compound and a polysulphide, heating without an accompanying vulcanization of the latex, and depositing rubber from the thus treated latex on a porous form.

7. A method of increasing the filterability of latex which comprises treating the latex with a colloidal sulphide, and heating the thus treated latex without an accompanying vulcanization.

8. A method of increasing the filterability of vulcanized latex which comprises treating the latex with colloidal zinc sulphide and heating the thus treated latex.

9. A process for manufacturing rubber articles from latex which comprises treating the latex with material which increases its filterability, agitating and heating the latex prior to deposition of rubber therefrom while retaining the said material in the latex, and depositing rubber from the thus treated latex.

10. A process for manufacturing rubber articles from latex which comprises diluting and treating unvulcanized latex, without an accompanying vulcanization, with material which increases its filterability, and depositing rubber from the thus treated unvulcanized latex.

11. A process for manufacturing rubber articles from latex which comprises diluting the latex, treating the latex with material which increases its filterability, agitating the latex while retaining the said material in the latex, and depositing rubber from the thus treated latex.

12. A process for manufacturing rubber articles from latex which comprises diluting and treating unvulcanized latex with material which increases its filterability, heating the latex without an accompanying vulcanization, and depositing rubber from the thus treated latex.

13. A process for manufacturing rubber articles from latex which comprises diluting the latex, treating the latex with material which increases its filterability, agitating the latex while retaining the said material in the latex, heating the latex, and depositing rubber from the thus treated latex.

14. A method of increasing the rate of deposition of rubber from latex which comprises diluting unvulcanized latex to a solid content between 8 and 24% and treating the unvulcanized latex, in the absence of an accompanying vulcanization, with material which increases its filterability.

15. A method of increasing the filterability of latex which comprises diluting the latex to a solid content between 8 and 24%, treating the latex with material which increases its filterability, and agitating the latex while retaining the said material in the latex.

16. A method of increasing the rate of deposition of rubber from latex which comprises diluting unvulcanized latex to a solid content of between 8 and 24%, treating the unvulcanized latex with material which increases its filterability, and heating the latex without an accompanying vulcanization.

17. A method of increasing the filterability of latex which comprises diluting the latex to a solid content between 8 and 24%, treating the latex with material which increases its filterability, heating the latex and agitating the latex while retaining the said material in the latex.

18. A process for manufacturing rubber articles from latex which comprises treating the latex with a colloidal sulphide without an accompanying vulcanization of the latex, and depositing rubber from the thus treated latex.

19. A process for manufacturing rubber articles from latex which comprises treating unvulcanized latex, without an accompanying vulcanization, with a metallic compound and a polysulphide to form therewith a colloidal sulphide, and depositing rubber from the thus treated latex on a porous form in the shape desired.

20. A process for manufacturing rubber articles from latex which comprises treating unvulcanized latex without an accompanying vulcanization, with a compound of bivalent metal and a solution of a polysulphide which together react to increase the filterability of latex and depositing rubber from the thus treated latex on a porous form in the shape desired by withdrawing aqueous matter through the form and removing said matter.

21. A process for manufacturing rubber articles from latex which comprises treating unvulcanized latex without an accompanying vulcanization with a zinc compound and a solution of sodium polysulphide to form a colloidal zinc sulphide, and depositing rubber from the thus treated latex on a porous form in the shape desired.

22. A method of increasing the filterability of unvulcanized latex which comprises treating the unvulcanized latex with colloidal sulphide in the absence of an accompanying vulcanization of the latex.

23. A method of increasing the filterability of latex which comprises treating latex with colloidal zinc sulphide in the absence of an accompanying vulcanization of the latex.

24. A method of increasing the filterability of vulcanized latex which comprises treating the vulcanized latex with colloidal sulphide.

25. A method of increasing the filterability of latex which comprises treating latex with a metallic compound and a solution of polysulphide in the absence of an accompanying vulcanization of the latex.

26. A method of increasing the filterability of latex which comprises treating latex with a zinc compound and a solution of sodium polysulphide in the absence of an accompanying vulcanization of the latex.

27. A method of increasing the filterability of latex which comprises diluting the latex to a solid content between 8 and 24%, and treating the latex, in the absence of an accompanying vulcanization, with a metallic compound and a polysulphide in solution to form therewith a colloidal sulphide.

28. A method of increasing the filterability of latex which comprises diluting the latex to a solid content between 8 and 24%, treating the latex with a metallic compound and a polysulphide in solution to form therewith a colloidal sulphide, and agitating the latex while retaining the said colloidal sulphide in the latex.

29. A method of increasing the filterability of latex which comprises diluting the latex to a solid content between 8 and 24%, treating the latex with a metallic compound and a polysulphide in solution to form therewith a colloidal sulphide, and heating the latex without an accompanying vulcanization.

30. A method of increasing the filterability of latex which comprises diluting the latex to a solid content between 8 and 24%, treating the latex with a metallic compound and a polysulphide in solution to form therewith a colloidal sulphide, heating the latex and agitating the latex while retaining the said substances in the latex.

31. A process for manufacturing rubber articles directly from latex which consists in diluting the latex to a solid content between 8 and 24%, adding to the latex a metallic compound and the equivalent of between .75 and 1.1% by volume of a 42% solution of a polysulphide which together react to increase the filterability of latex and depositing rubber from the thus treated latex on a porous form in the shape desired by withdrawing aqueous matter through the form and removing said matter.

32. A process for manufacturing rubber articles directly from latex which consists in diluting the latex to a solid content between 8 and 24%, adding to the latex a metallic compound and the equivalent of between .75 and 1.1% by volume of a 42% solution of a polysulphide to form therewith a colloidal sulphide, agitating the latex, and depositing rubber from the thus treated latex on a porous form in the shape desired by withdrawing aqueous matter through the form and removing said matter.

33. A process for manufacturing rubber articles directly from latex which consists in diluting the latex to a solid content between 8 and 24%, adding to the latex a metallic compound and the equivalent of between .75 and 1.1% by volume of a 42% solution of a polysulphide to form therewith a colloidal sulphide, heating the latex, and depositing rubber from the thus treated latex on a porous form in the shape desired by withdrawing aqueous matter through the form and removing said matter.

34. A process for manufacturing rubber articles directly from latex which consists in diluting the latex to a solid content between 8 and 24%, adding to the latex a zinc compound and between .75 and 1.1% by volume of a 42% solution of an alkali polysulphide, agitating and heating the latex, and depositing rubber from the thus treated latex on a porous form in the shape desired by withdrawing aqueous matter through the form and removing said matter.

35. A process for manufacturing rubber articles from vulcanized latex which comprises treating the vulcanized latex with colloidal zinc sulphide, and depositing rubber from the thus treated latex on a porous form in the shape desired.

36. A process for manufacturing articles from vulcanized latex which comprises adding material which increases the filterability of the vulcanized latex, diluting the latex, and depositing rubber from the thus treated latex.

37. A method of increasing the filterability of vulcanized latex which comprises diluting and adding colloidal zinc sulphide to the vulcanized latex.

38. A process for manufacturing articles from vulcanized latex which comprises adding material which increases the filterability of the vulcanized latex, diluting and heating the latex, and depositing rubber from the thus treated latex.

39. A method of increasing the filterability of vulcanized latex which comprises diluting, heating and adding colloidal sulphide to the vulcanized latex.

Signed at New York, county and State of New York, this 18 day of August, 1927.

EARDLEY HAZELL.